United States Patent
Hong et al.

(10) Patent No.: US 10,601,035 B2
(45) Date of Patent: Mar. 24, 2020

(54) METHOD OF PREPARING CORE-SHELL PARTICLES

(71) Applicants: POSCO, Pohang-si (KR); RESEARCH INSTITUTE OF INDUSTRIAL SCIENCE & TECHNOLOGY, Pohang-si (KR)

(72) Inventors: Jong Pal Hong, Seongnam-si (KR); Jung Hoon Song, Seoul (KR); Geun Hwangbo, Incheon (KR); Gyeong Rye Choi, Seongnam-si (KR)

(73) Assignees: POSCO, Pohang-si (KR); RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 0 days.

(21) Appl. No.: 16/046,078

(22) Filed: Jul. 26, 2018

(65) Prior Publication Data
US 2018/0331355 A1    Nov. 15, 2018

Related U.S. Application Data

(62) Division of application No. 14/897,012, filed as application No. PCT/KR2014/005201 on Jun. 13, 2014, now abandoned.

(30) Foreign Application Priority Data

Jun. 14, 2013 (KR) .................. 10-2013-0068434

(51) Int. Cl.
*H01M 4/36* (2006.01)
*H01M 4/485* (2010.01)
(Continued)

(52) U.S. Cl.
CPC ............. *H01M 4/366* (2013.01); *B01J 8/085* (2013.01); *B01J 8/087* (2013.01); *B01J 8/10* (2013.01);
(Continued)

(58) Field of Classification Search
CPC ................ H01M 4/366; B01J 8/085
(Continued)

(56) References Cited

U.S. PATENT DOCUMENTS

| | | |
|---|---|---|
| 4,353,874 A | 10/1982 | Keller et al. |
| 4,563,315 A | 1/1986 | Walter et al. |

(Continued)

FOREIGN PATENT DOCUMENTS

| | | |
|---|---|---|
| CN | 202797144 | 3/2013 |
| EP | 2735366 | 5/2014 |

(Continued)

OTHER PUBLICATIONS

European Search Report—European Application No. 14811726.0, dated Dec. 2, 2016, citing WO 2013/012147, KR 2013 0032563, WO 2013/042986, EP 2 891 517, EP 2 810 706, KR 2011 0099935, KR 2012 0028576.

(Continued)

*Primary Examiner* — Tabatha L Penny
(74) *Attorney, Agent, or Firm* — Cantor Colburn LLP

(57) ABSTRACT

A method of manufacturing core-shell particles comprises: filling a buffer into a rotor, which is extended in a longitudinal direction, and is accommodated so as to be spaced apart from an inner wall side of a non-rotational hollow cylinder extended in a longitudinal direction and then discharging air to outside; rotating the rotor after terminating the filling; forming a core-shell precursor by supplying raw materials from a first storage and a second storage, which comprise a material forming a core, into an interior of the (Continued)

cylinder in which the rotor rotates; supplying a shell material for coating the core to the interior of the cylinder in which a core-type precursor is formed; separating a liquid comprising core-shell particles formed through the supplying into a solid and a liquid; and drying the core-shell particles obtained through the separating.

3 Claims, 2 Drawing Sheets

(51) Int. Cl.
*H01M 4/525* (2010.01)
*C01G 3/00* (2006.01)
*B01J 8/08* (2006.01)
*B01J 8/10* (2006.01)
*B01J 19/28* (2006.01)
*B01J 19/18* (2006.01)
*B05C 3/08* (2006.01)
*H01M 4/38* (2006.01)
*H01M 4/58* (2010.01)
*H01M 4/60* (2006.01)

(52) U.S. Cl.
CPC ........... *B01J 19/18* (2013.01); *B01J 19/1806* (2013.01); *B01J 19/28* (2013.01); *B05C 3/08* (2013.01); *C01G 3/006* (2013.01); *H01M 4/38* (2013.01); *H01M 4/485* (2013.01); *H01M 4/525* (2013.01); *H01M 4/5825* (2013.01); *H01M 4/602* (2013.01); *B01J 2208/00212* (2013.01); *B01J 2208/00584* (2013.01); *B01J 2219/00094* (2013.01); *B01J 2219/00189* (2013.01); *B01J 2219/00889* (2013.01); *B01J 2219/00894* (2013.01); *B01J 2219/00905* (2013.01); *B01J 2219/1943* (2013.01); *C01P 2004/84* (2013.01); *H01M 2220/30* (2013.01)

(58) Field of Classification Search
USPC ........................................................ 427/212
See application file for complete search history.

(56) References Cited

U.S. PATENT DOCUMENTS

| 5,104,232 | A | 4/1992 | Lennox, III |
|---|---|---|---|
| 6,824,821 | B1 | 11/2004 | Gillman et al. |
| 6,977,064 | B1 | 12/2005 | Adris et al. |
| 8,142,932 | B2 | 3/2012 | Sun et al. |
| 8,853,333 | B2 | 10/2014 | Stephan et al. |
| 2004/0068019 | A1 | 4/2004 | Higuchi et al. |
| 2004/0188077 | A1 | 9/2004 | Holl |
| 2004/0250757 | A1 | 12/2004 | Natsuyama et al. |
| 2007/0280895 | A1* | 12/2007 | Weimer ............... A61K 8/11 424/59 |
| 2008/0160410 | A1 | 7/2008 | Sun et al. |
| 2008/0193841 | A1 | 8/2008 | Sun et al. |
| 2008/0257888 | A1 | 10/2008 | Lee |
| 2009/0017224 | A1 | 1/2009 | Brendel |
| 2009/0272939 | A1* | 11/2009 | Sun .................. C01G 45/1242 252/182.1 |
| 2010/0077956 | A1 | 4/2010 | Zuehlke et al. |
| 2011/0178254 | A1 | 7/2011 | Matsuba et al. |
| 2012/0080649 | A1 | 4/2012 | Koenig, Jr. et al. |
| 2013/0126329 | A1 | 5/2013 | Zhu |
| 2014/0065058 | A1 | 3/2014 | Park et al. |
| 2014/0147338 | A1 | 5/2014 | Hong et al. |
| 2015/0165340 | A1 | 6/2015 | Hong et al. |
| 2015/0258524 | A1 | 9/2015 | Hong et al. |
| 2015/0298095 | A1 | 10/2015 | Ashe |

FOREIGN PATENT DOCUMENTS

| EP | 2810706 | 12/2014 |
|---|---|---|
| EP | 2891517 | 7/2015 |
| JP | 2006504513 | 2/2006 |
| JP | 2010511990 | 4/2010 |
| JP | 2015533632 | 11/2015 |
| KR | 1020100112843 | 10/2010 |
| KR | 20110099935 | 9/2011 |
| KR | 101084226 | 11/2011 |
| KR | 101092337 | 12/2011 |
| KR | 20120028576 | 3/2012 |
| KR | 101202079 | 11/2012 |
| KR | 1020130031055 | 3/2013 |
| KR | 20130032563 | 4/2013 |
| WO | 2010027119 | 3/2010 |
| WO | 2011034165 | 3/2011 |
| WO | 2013012147 | 1/2013 |
| WO | 2013042986 | 3/2013 |

OTHER PUBLICATIONS

International Search Report—PCT/KR2014/005201 dated Aug. 28, 2014.

* cited by examiner

METHOD OF PREPARING CORE-SHELL PARTICLES

BACKGROUND OF THE INVENTION

(a) Field of the Invention

The present invention relates to an apparatus for manufacturing core-shell particles, particularly core-shell particles used in a positive electrode active material of lithium rechargeable batteries, in order to form a shell on a core by injecting a gas, liquid, and/or solid material in the presence of a liquid-type solvent, and a method of manufacturing the core-shell particles using the same.

(b) Description of the Related Art

As mobile device technology continues to develop and demand therefor continues to increase, demand for rechargeable batteries as energy sources is rapidly increasing. Among these rechargeable batteries, lithium rechargeable batteries, which exhibit high energy density and operating electrical potential, and have long cycle lifespan and a low self-discharge rate, are commercially available and widely used.

As positive electrode active materials of such lithium rechargeable batteries, lithium-containing cobalt oxides such as $LiCoO_2$ are mainly used. In addition thereto, use of $LiMnO_2$ with a layered crystal structure, lithium-containing manganese oxides such as $LiMn_2O_4$ with a spinel crystal structure, lithium-containing nickel oxides such as $LiNiO_2$, or ternary $LiNixMnyCO(1-x-y)O_2$ is also under consideration.

In general, positive electrode active materials of lithium rechargeable batteries are prepared through solid-state reaction at a high temperature of 700° C. or more.

However, when positive electrode active materials are prepared through solid-state reaction, the positive electrode active materials are subjected to physical mixing and grinding, thus resulting in a non-uniform mixed state. Accordingly, the mixing and grinding should be repeated several times, whereby time taken for manufacturing the same is greatly increased and preparation costs increase.

Accordingly, a sol-gel method including hydrolysis and condensation and a wet process including a co-precipitation method as representative examples were developed.

Thereamong, through the co-precipitation method, a chloride, a nitride, a sulfide, or the like containing a raw material is precipitated with a hydroxide in an alkaline co-precipitation solution and then calcined to prepare an oxide powder. When positive electrode active materials are prepared through co-precipitation, the pH, temperature, and stirring conditions of a co-precipitation solution should be controlled.

In an existing co-precipitation method, positive electrode active materials are prepared using a continuous stirred-tank reactor (CSTR). However, when positive electrode active materials are prepared using the CSTR reactor, it is not easy to increase reaction scale, a force generating a vortex varies depending upon a distance from the inner turbine of the reactor, used devices are expensive, an energy dissipation rate is high, and it is difficult to apply the method to a continuous process.

In order to address the problems of a CSTR reactor, a reaction device using a Taylor vortex was considered (Korean Patent Application Pub. No. 2010-0112843). However, the device can be used in general mixing, extraction, chemical reaction, etc., but cannot be used in manufacturing positive electrode active materials.

In addition, in the case of general positive electrode active materials, a precursor is prepared and then an external circumferential side of a core composed of an active material is coated through a separate process to form a shell.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made to address the problems described above and provides an apparatus for manufacturing core-shell particles, particularly core-shell particles used in a positive electrode active material of lithium rechargeable batteries, in order to form a shell on a core by injecting a gas, liquid, and/or solid material in the presence of a liquid-type solvent.

In accordance with an aspect of the present invention, the above and other objects can be accomplished by the provision of an apparatus for manufacturing core-shell particles including: a reactor including a non-rotational hollow cylinder extended in a longitudinal direction, a rotor accommodated so as to be spaced apart from an inner wall side of the cylinder and extended in a longitudinal direction, a driving part connected to one end of the rotor and rotating the rotor, a first raw material inlet and a second raw material inlet respectively formed so as to be connected to the interior of the cylinder at an external circumferential side of one end of the cylinder with respect to a longitudinal direction of the cylinder, an outlet formed at another end of the cylinder so as to be connected to the interior of the cylinder in an opposite direction from the first raw material inlet and the second raw material inlet, at least one shell material inlet formed at an external circumferential side of the cylinder and supplying a shell material to the interior of the cylinder, a heat exchange material moving path formed between an external circumferential side and an interior circumference of the cylinder and providing a moving path of a heat exchange material, a heat exchange material inlet connected to the heat exchange material moving path and serving to inject a heat exchange material, and a heat exchange material outlet connected to the heat exchange material moving path and discharging a heat exchange material;

a first storage connected to the first raw material inlet of the reactor;

a second storage connected to the second raw material inlet of the reactor;

a solid-liquid separator connected to the outlet of the reactor and separating a product discharged from the outlet into solid particles and a liquid; and a drier connected to the solid-liquid separator and drying solid particles separated by the solid-liquid separator.

In accordance with another aspect of the present invention, a method of manufacturing core-shell particles is provided, including: filling a buffer into a rotor, which is extended in a longitudinal direction, and is accommodated so as to be spaced apart from an inner wall side of a non-rotational hollow cylinder extended in a longitudinal direction and then discharging air to the outside;

rotating the rotor after terminating the filling;

forming a core-shell precursor by supplying raw materials from a first storage and a second storage, which include a material forming a core, into an interior of the cylinder in which the rotor rotates;

supplying a shell material for coating the core to the interior of the cylinder in which a core-type precursor is formed;

separating a liquid including core-shell particles formed through the supplying into a solid and a liquid; and drying the core-shell particles obtained through the separating.

In accordance with yet another aspect of the present invention, an apparatus for manufacturing core-shell particles, particularly core-shell particles used in a positive electrode active material of lithium rechargeable batteries, is provided, in order to form a shell on a core by injecting a gas, liquid, and/or solid material in the presence of a liquid-type solvent.

In particular, according to the present invention, the core-shell particles may be prepared by manufacturing a positive electrode active material precursor as a core type and then coating the same in one reactor without a separate coating process.

DETAILED DESCRIPTION

Figure 1:
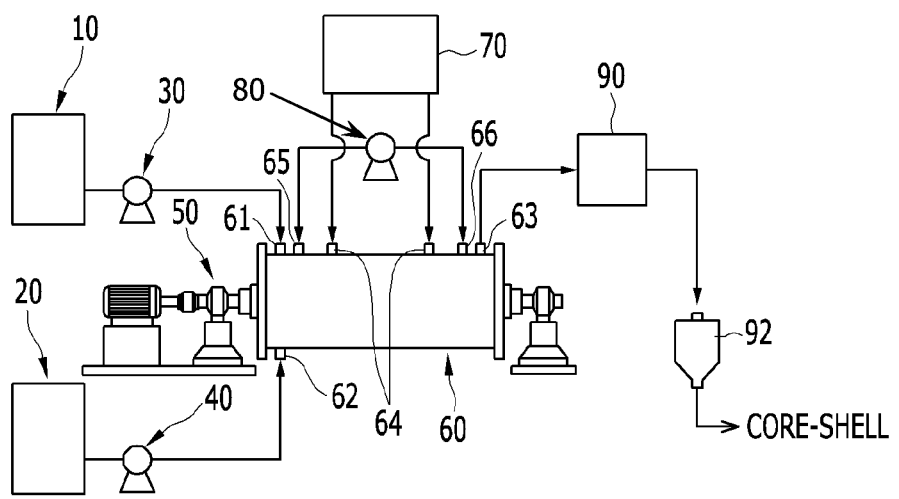
FIG. 1 is a view illustrating an overall configuration of an apparatus for manufacturing core-shell particles according to the present invention.

Hereinafter, the present invention is described in more detail

In an embodiment, the present invention provides an apparatus for manufacturing core-shell particles, including: a reactor including a non-rotational hollow cylinder extended in a longitudinal direction, a rotor accommodated so as to be spaced apart from an inner wall side of the cylinder and extended in a longitudinal direction, a driving part connected to one end of the rotor and rotating the rotor, a first raw material inlet and a second raw material inlet respectively formed so as to be connected to the interior of the cylinder at an external circumferential side of one end of the cylinder with respect to a longitudinal direction of the cylinder, an outlet formed at another end of the cylinder so as to be connected to the interior of the cylinder in an opposite direction from the first raw material inlet and the second raw material inlet, at least one shell material inlet formed at an external circumferential side of the cylinder and supplying a shell material to the interior of the cylinder, a heat exchange material moving path formed between an external circumferential side and an interior circumference of the cylinder and providing a moving path of a heat exchange material, a heat exchange material inlet connected to the heat exchange material moving path and serving to inject a heat exchange material, and a heat exchange material outlet connected to the heat exchange material moving path and discharging a heat exchange material; a first storage connected to the first raw material inlet of the reactor; a second storage connected to the second raw material inlet of the reactor; a solid-liquid separator connected to the outlet of the reactor and separating a product discharged from the outlet into solid particles and a liquid; and a drier connected to the solid-liquid separator and drying solid particles separated by the solid-liquid separator.

In another embodiment, the present invention provides a method of manufacturing core-shell particles including filling a buffer into a rotor, which is extended in a longitudinal direction, and is accommodated so as to be spaced apart from an inner wall side of a non-rotational hollow cylinder extended in a longitudinal direction and then discharging air to the outside, rotating the rotor after terminating the filling, forming a core-shell precursor by supplying raw materials from a first storage and a second storage, which include a material forming a core, into an interior of the cylinder in which the rotor rotates, supplying a shell material for coating the core to the interior of the cylinder in which a core-type precursor is formed, separating a liquid including core-shell particles formed through the supplying into a solid and a liquid, and drying the core-shell particles obtained through the separating.

Hereinafter, the present invention is described in detail with reference to the accompanying drawings. However, it should be understand that the following descriptions are merely to concretely explain the spirit of the invention, and therefore there is no intent to limit the invention to the descriptions.

Figure 2:
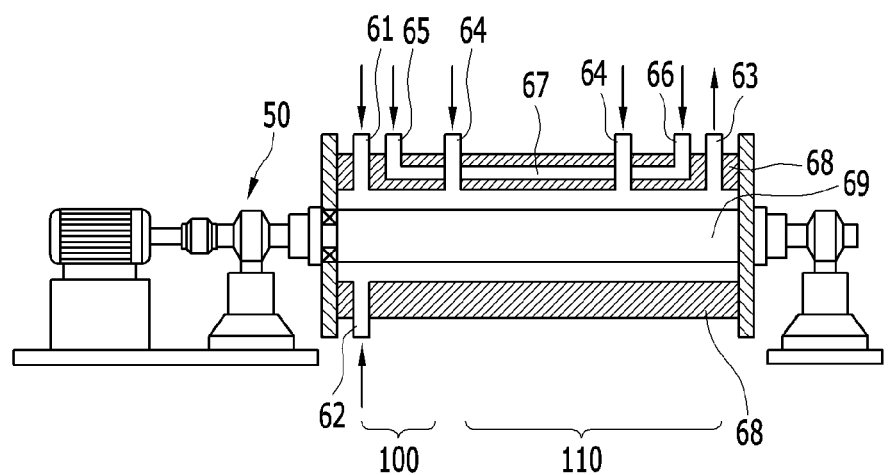
FIG. 2 is a cross-sectional view illustrating a reactor included in an apparatus for manufacturing core-shell particles according to the present invention.

FIG. 1 is a view illustrating an overall configuration of an apparatus for manufacturing core-shell particles according to the present invention, and FIG. 2 is a cross-sectional view illustrating a reactor included in an apparatus for manufacturing core-shell particles according to the present invention. Hereinafter, the present invention is described with reference to FIGS. 1 and 2.

As shown in FIGS. 1 and 2, the apparatus for manufacturing core-shell particles according to the present invention includes: a reactor 60 including a non-rotational hollow cylinder 68 extended in a longitudinal direction, a rotor 69 accommodated so as to be spaced apart from an inner wall side of the cylinder 68 and extended in a longitudinal direction, a driving part 50 connected to one end of the rotor 69 and rotating the rotor 69, a first raw material inlet 61 and a second raw material inlet 62 respectively formed so as to be connected to the interior of the cylinder 68 at an external circumferential side of one end of the cylinder 68 with respect to a longitudinal direction of the cylinder 68, an outlet 63 formed at another end of the cylinder 68 so as to be connected to the interior of the cylinder 68 in an opposite direction from the first raw material inlet 61 and the second raw material inlet 62, at least one shell material inlet 64 formed at an external circumferential side of the cylinder 68 and supplying a shell material to the interior of the cylinder 68, a heat exchange material moving path 67 formed between an external circumferential side and an interior circumference of the cylinder 68 and providing a moving path of a heat exchange material, a heat exchange material inlet 65 connected to the heat exchange material moving path 67 and serving to inject a heat exchange material, and a heat exchange material outlet 66 connected to the heat exchange material moving path 67 and discharging a heat exchange material; a first storage 10 connected to the first raw material inlet 61 of the reactor 60; a second storage 20 connected to the second raw material inlet 62 of the reactor 60; a solid-liquid separator 90 connected to the outlet 63 of the reactor 60 and separating a product discharged from the outlet 63 into solid particles and a liquid; and a drier 92 connected to the solid-liquid separator 90 and drying solid particles separated by the solid-liquid separator 90.

The reactor 60 forms a Taylor vortex and basically includes the cylinder 68 and the rotor 69, which have the same central axis and are extended in a longitudinal direction, the raw material inlets 61 and 62, the outlet 63, and the driving part 50 accommodated in the cylinder 68 and determining rotation of the rotor 69.

Here, each of materials to be reacted are input between the cylinder 68 and the rotor 69 via the first raw material inlet 61 and the second raw material inlet 62. The rotor 69 is rotated by operating the driving part 50, thereby generating a rotational flow.

In this case, as the driving part, a variable speed stirrer motor able to control a rotation speed to 1 rpm or more is recommended.

Meanwhile, when an angular speed of the rotor 69 is low, laminar Couette flow occurs. On the other hand, as the angular speed is increased, fluids tend to move in an outer direction of the cylinder. Accordingly, the fluid becomes unstable and a Taylor vortex occurs at a specific threshold speed or more.

A Taylor vortex is arranged in a very regular ring shape in an axis direction and rotates in opposite directions. Accordingly, mixing does not occur in an axis direction, and thus uniform mixing is induced to mix raw materials. Accordingly, a core as a precursor for manufacturing core-shell particles may be generated.

In this case, when a shell material is injected into the interior of the cylinder 68 via one side of the reactor 60, particularly the at least one shell material inlet 64 formed at the cylinder 68 of the reactor 60, an external circumferential side of the core is coated to form core-shell-type double particles.

Here, the reactor 60 includes a precursor formation part 100, in which a precursor is formed, located at the first raw material inlet 61 and second raw material inlet 62 to which a raw material, preferably a raw material used to prepare positive electrode active materials of lithium rechargeable batteries, is injected, with respect to a longitudinal direction of the reactor 60. A core-shell formation part 110 is present from a rear part of the precursor formation part 100 to a part to which a shell material is injected.

Meanwhile, the raw material forming a core as a precursor according to the present invention is not specifically limited so long as it is one generally used in the art.

In particular, the raw material may form a precursor as a core through injection of a gas, liquid, and/or solid material in the presence of a liquid-type solvent.

As an embodiment, a core composed of lithium carbonate may be formed through liquid-liquid reaction using lithium chloride and sodium carbonate as in Formula 1.

$$LiCl+Na_2CO_3(l) \rightarrow Li_2CO_3 \quad [\text{Formula 1}]$$

As another embodiment, a core composed of lithium carbonate may be formed through gas-liquid reaction using lithium hydroxide and carbon dioxide as in Formula 2.

$$2LiOH+3CO_2(g) \rightarrow Li_2CO_3 \quad [\text{Formula 2}]$$

As another embodiment, a core composed of copper aluminum carbonate may be formed through solid-liquid reaction using aluminum carbonate and copper sulfate as in Formula 3.

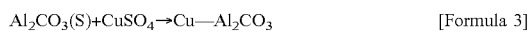

$$Al_2CO_3(S)+CuSO_4 \rightarrow Cu-Al_2CO_3 \quad [\text{Formula 3}]$$

Here, lithium chloride and sodium carbonate; lithium hydroxide and carbon dioxide; or aluminum carbonate and copper sulfate, as a pair of raw materials, may be respectively stored in the first storage 10 and the second storage 20 connected to the first raw material inlet 61 and the second raw material inlet 62.

Meanwhile, a shell material used to prepare core-shell particles through coating of the core is not specifically limited so long as the material may coat the core. Particularly, the material may be a polymer, a metal, a metal oxide, etc., more particularly an inorganic metal including copper, cobalt, or manganese, or a polymer or an oligomer selected from the group consisting of polyethylene glycol, polyethylene oxide, polyethylene glycol methyl ether, polyethylene glycol dimethyl ether, polypropylene oxide, polyethylene, polypropylene, polyisobutylene, and polyvinylidene chloride.

In addition, the shell material may be stored in a separate storage unit, e.g., a shell material storage 70, and then, according to selection of a user, supplied to the reactor 60 by connecting the shell material storage 70 to the at least one shell material inlet 64.

The at least one shell material inlet 64 is provided at the reactor 60 such that a shell is formed on a core. The location and the number of the at least one shell material inlet 64 are determined according to users' selection, and preferably, the at least one shell material inlet 64 is formed between the raw material inlets 61 and 62 and the outlet 63 provided at the cylinder 68 of the reactor 60 extended in a longitudinal direction.

The reactor 60 according to the present invention may control core-shell particle formation reaction through temperature control.

In this case, the reactor 60 includes the heat exchange material moving path 67, in which a heat exchange material moves to heat and cool the reactor 60, between an external circumferential side and an interior circumference of the cylinder 68. The heat exchange material moving path 67 may include the heat exchange material inlet 65 and the heat exchange material outlet 66 for injecting or discharging the heat exchange material.

Here, the heat exchange material may be a material, e.g., a coolant, generally used in the art.

As a specific embodiment, the heat exchange material moving path 67 according to the present invention may be formed in plural or in a radial structure between an interior circumference side and an external circumferential side of the cylinder 68 so as to more rapidly control the temperature of the reactor 60.

As another specific embodiment, the apparatus for manufacturing core-shell particles according to the present invention may further include a circulation pump 80 for circulating a heat exchange material connected between the heat exchange material inlet 65 and the heat exchange material outlet 66 to continuously circulate the heat exchange material.

Meanwhile, a first pump 30 is connected between the first storage 10 including the raw material according to the present invention and the first raw material inlet 61, which supplies the raw material, connected to the first storage 10, and a second pump 40 is connected between the second storage 20 including the other raw material and the second raw material inlet 62, which supplies the other raw material, connected to the second storage 20, to quantitatively control the amount of the raw material supplied.

In this case, the first pump 30 and the second pump 40 are not specifically limited, but particularly, a metering pump may be used.

The solid-liquid separator 90 according to the present invention is connected to the outlet 63 of the reactor 60 and separates a product discharged from the outlet 63, e.g., a liquid including core-shell particles, into a solid and a liquid. As the solid-liquid separator 90, any general solid-liquid separation apparatuses used in the art performing such function may be used, and particularly, a centrifuge or a dehydrator may be used.

The drier 92 according to the present invention is connected to the solid-liquid separator 90 and dries solid particles, particularly core-shell particles, separated from the solid-liquid separator 90.

In the drier 92, drying is performed using a method generally used in the art.

As a specific embodiment, the apparatus for manufacturing core-shell particles according to the present invention may further include a scanning electron microscope which is connected to a rear part of the drier 92, to analyze uniformity of the shape and size of dried core-shell particles, preferably positive electrode active material particles composed of core-shell particles.

As another specific embodiment, the apparatus for manufacturing core-shell particles according to the present invention may further include a densitometer for measuring the density of a positive electrode active material composed of core-shell particles at a rear part of the scanning electron microscope.

Hereinafter, a method of manufacturing core-shell particles is described using the apparatus for manufacturing core-shell particles having such a configuration according to the present invention.

First, the method includes: a buffer solution filling step of filling a buffer into the rotor 69, which is extended in a longitudinal direction, and is accommodated so as to be spaced apart from an inner wall side of the cylinder 68 included in the non-rotational hollow reactor 60 extended in a longitudinal direction and then discharging air to the outside; a rotor rotation step of rotating the rotor 69 after terminating the buffer solution filling step; a precursor formation step of forming a core-shell precursor by supplying raw materials from the first storage 10 and the second storage 20, which include a material forming a core, into the interior of the cylinder 68 in which the rotor 69 rotates; a shell material injection step of supplying a shell material for coating the core to the interior of the cylinder 68 in which the core-type precursor is formed; a solid-liquid separation step of separating a liquid including core-shell particles formed through the shell material injection into a solid and a liquid; and a drying step of drying the core-shell particles obtained through the solid-liquid separation step.

Here, a rotation speed of the rotor 69 may be 1 rpm or more.

In addition, any buffer generally used in the art may be used.

Meanwhile, as the liquid including the core-shell particles separated in the solid-liquid separation step, a reactant in a normal state within the reactor is used. In each of the first storage 10 and the second storage 20, a pair of lithium chloride and sodium carbonate, a pair of lithium hydroxide and carbon dioxide, or a pair of aluminum carbonate and copper sulfate is stored.

However, raw materials stored in the first storage 10 and the second storage 20 are not limited to the materials described above.

In addition, as the shell material, an inorganic metal including copper, cobalt, or manganese; or a polymer or an oligomer selected from the group consisting of polyethylene glycol, polyethylene oxide, polyethylene glycol methyl ether, polyethylene glycol dimethyl ether, polypropylene oxide, polyethylene, polypropylene, polyisobutylene, and polyvinylidene chloride may be used.

Core-shell particles prepared according to the present invention preferably have diameters of several nanometers to micrometers, but are not limited thereto.

Hereinafter, the present invention is described in more detail by way of examples. However, it should be understand that the following examples are merely to concretely explain the spirit of the invention, and therefore there is no intent to limit the invention to the examples.

Example

First, the interior of a reactor was filled with a buffer, and air remaining in the reactor was discharged to the outside.

Subsequently, a motor was operated to rotate a rotor of the reactor connected to the motor at 1000 rpm.

Lithium chloride stored in a first storage and sodium carbonate stored in a second storage were then injected into the reactor by means of a metering pump to form a core.

Next, copper ions were injected into a shell material inlet to coat an external circumferential side of a core with a shell material. As a result, core-shell particles were formed.

Liquid including core-shell particles were then separated into solid particles and a liquid by means of a centrifuge and the core-shell particles were dried. Finally, core-shell positive electrode active material particles were prepared.

Example 2

An experiment was carried out in the same manner as in Example 1, except that, instead of the lithium chloride stored in the first storage and the sodium carbonate stored in the second storage, lithium hydroxide was stored in the first storage and carbon dioxide was stored in the second storage.

Example 3

An experiment was carried out in the same manner as in Example 1, except that, instead of the lithium chloride stored in a first storage and the sodium carbonate stored in a second storage, aluminum carbonate was stored in the first storage and copper sulfate was stored in the second storage.

As described above, those skilled in the art will appreciate that the present invention may be carried out in specific ways other than those set forth herein without departing from the spirit and essential characteristics of the present invention. Therefore, the present invention is not limited to the examples described above, and covers modifications of the technical spirit substantially equivalent thereto. The scope of the invention is defined not by the detailed description of the invention but by the appended claims, and all differences within the scope will be construed as within the scope of the present invention.

What is claimed is:

1. A method of manufacturing core-shell particles, the method comprising:
   filling a buffer into a rotor, which is extended in a longitudinal direction, and is accommodated so as to be spaced apart from an inner wall side of a non-rotational hollow cylinder extended in a longitudinal direction and then discharging air to outside of the rotor;
   rotating the rotor after terminating the filling;
   forming a core-shell precursor by supplying raw materials from a first storage and a second storage, which comprise a material forming a core, into an interior of the cylinder in which the rotor rotates;

supplying a shell material for coating the core to the interior of the cylinder in which a core-type precursor is formed;

separating a liquid comprising core-shell particles formed through the supplying of the shell material into a solid and a liquid; and drying the core-shell particles obtained through the separating.

2. The method according to claim 1, wherein lithium chloride and sodium carbonate; or lithium hydroxide and carbon dioxide; or aluminum carbonate and copper sulfate, as a pair of raw materials, are respectively stored in the first storage and the second storage.

3. The method according to claim 1, wherein the shell material is an inorganic metal comprising copper, cobalt, or manganese; or is a polymer or an oligomer selected from the group consisting of polyethylene glycol, polyethylene oxide, polyethylene glycol methyl ether, polyethylene glycol dimethyl ether, polypropylene oxide, polyethylene, polypropylene, polyisobutylene, and polyvinylidene chloride.

* * * * *